United States Patent
Morita et al.

(10) Patent No.: US 10,458,776 B2
(45) Date of Patent: Oct. 29, 2019

(54) ABRASION INSPECTION APPARATUS, ABRASION INSPECTION METHOD, AND PROGRAM

(71) Applicant: MITSUBISHI HEAVY INDUSTRIES, LTD., Tokyo (JP)

(72) Inventors: Katsuaki Morita, Tokyo (JP); Masahiro Yamada, Tokyo (JP); Kazuki Ozaki, Tokyo (JP); Hiroyuki Kono, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/553,270

(22) PCT Filed: Nov. 20, 2015

(86) PCT No.: PCT/JP2015/082689
§ 371 (c)(1),
(2) Date: Aug. 24, 2017

(87) PCT Pub. No.: WO2016/136055
PCT Pub. Date: Sep. 1, 2016

(65) Prior Publication Data
US 2018/0031366 A1 Feb. 1, 2018

(30) Foreign Application Priority Data

Feb. 27, 2015 (JP) .................................. 2015-038661

(51) Int. Cl.
*G01B 11/02* (2006.01)
*B61B 13/00* (2006.01)
(Continued)

(52) U.S. Cl.
CPC ............ *G01B 11/026* (2013.01); *B61B 13/00* (2013.01); *B61F 9/00* (2013.01); *B61K 9/12* (2013.01);
(Continued)

(58) Field of Classification Search
CPC combination set(s) only.
See application file for complete search history.

(56) References Cited

U.S. PATENT DOCUMENTS 4,866,642 A    9/1989   Obrig et al.
5,801,304 A *  9/1998   Cantu ..................... B60C 11/12
                                                          73/146

(Continued)

FOREIGN PATENT DOCUMENTS

JP        3171209 B2      5/2001
JP        2003-11702 A    1/2003
(Continued)

OTHER PUBLICATIONS

International Search Report in PCT/JP2015/082689, dated Jan. 26, 2016. 8pp.
Written Opinion of the International Searching Authority in PCT/JP2015/082689, dated Jan. 26, 2016. 13pp.

*Primary Examiner* — Tsung Yin Tsai
(74) *Attorney, Agent, or Firm* — Kanesaka Berner and Partners, LLP

(57) ABSTRACT

An abrasion inspection apparatus includes: a first imaging unit installed on a track along which a vehicle is traveling, a guide wheel installed on the vehicle, the first imaging unit imaging an inside of the track; a second imaging unit installed on the track in a vehicle traveling direction with respect to the first imaging unit and imaging the inside of the track; an image acquisition unit acquiring a first image of a boundary of the guide wheel captured by the first imaging unit on a first direction side in the vehicle traveling direction, (Continued)

and a second image of the boundary of the guide wheel captured by the second imaging unit at the same time on an opposite side to the first direction side; and a guide wheel detection unit detecting an abrasion situation of the guide wheel according to a position of a boundary indicated in the acquired images.

5 Claims, 11 Drawing Sheets

(51) Int. Cl.

| | |
|---|---|
| *G01M 17/10* | (2006.01) |
| *G01B 11/08* | (2006.01) |
| *G01B 11/24* | (2006.01) |
| *B61K 9/12* | (2006.01) |
| *G01B 11/04* | (2006.01) |
| *B61F 9/00* | (2006.01) |
| *B61L 23/00* | (2006.01) |
| *B61L 27/00* | (2006.01) |
| *G01M 17/02* | (2006.01) |

(52) U.S. Cl.
CPC ........... *B61L 23/00* (2013.01); *B61L 27/0077* (2013.01); *B61L 27/0094* (2013.01); *G01B 11/02* (2013.01); *G01B 11/04* (2013.01); *G01B 11/08* (2013.01); *G01B 11/24* (2013.01); *G01M 17/027* (2013.01); *G01M 17/10* (2013.01)

(56) References Cited

U.S. PATENT DOCUMENTS

| | | | |
|---|---|---|---|
| 6,069,966 A | 5/2000 | Jones et al. | |
| 6,151,959 A * | 11/2000 | Cantu | B60C 11/12 |
| | | | 73/146 |
| 6,657,711 B1 * | 12/2003 | Kitagawa | G01B 11/2755 |
| | | | 280/86.758 |
| 9,110,032 B2 * | 8/2015 | Farley, III | G01M 17/027 |
| 10,019,805 B1 * | 7/2018 | Robinson | G06T 7/70 |
| 2010/0272370 A1 * | 10/2010 | Schilling | G06T 7/62 |
| | | | 382/199 |
| 2010/0302551 A1 * | 12/2010 | Akamatsu | G01B 11/24 |
| | | | 356/610 |
| 2011/0069323 A1 * | 3/2011 | Takahashi | G01B 11/25 |
| | | | 356/625 |
| 2012/0020526 A1 * | 1/2012 | Teti | G06T 7/0004 |
| | | | 382/104 |
| 2012/0067115 A1 | 3/2012 | Pingel | |
| 2013/0202156 A1 * | 8/2013 | Joly | G01M 17/027 |
| | | | 382/104 |
| 2014/0232852 A1 * | 8/2014 | Nobis | G01B 11/22 |
| | | | 348/128 |
| 2014/0283591 A1 * | 9/2014 | Takahashi | G01B 11/245 |
| | | | 73/146 |

FOREIGN PATENT DOCUMENTS

| | | |
|---|---|---|
| JP | 3464678 B2 | 11/2003 |
| JP | 2009-133799 A | 6/2009 |
| JP | 2012-523547 A | 10/2012 |

\* cited by examiner

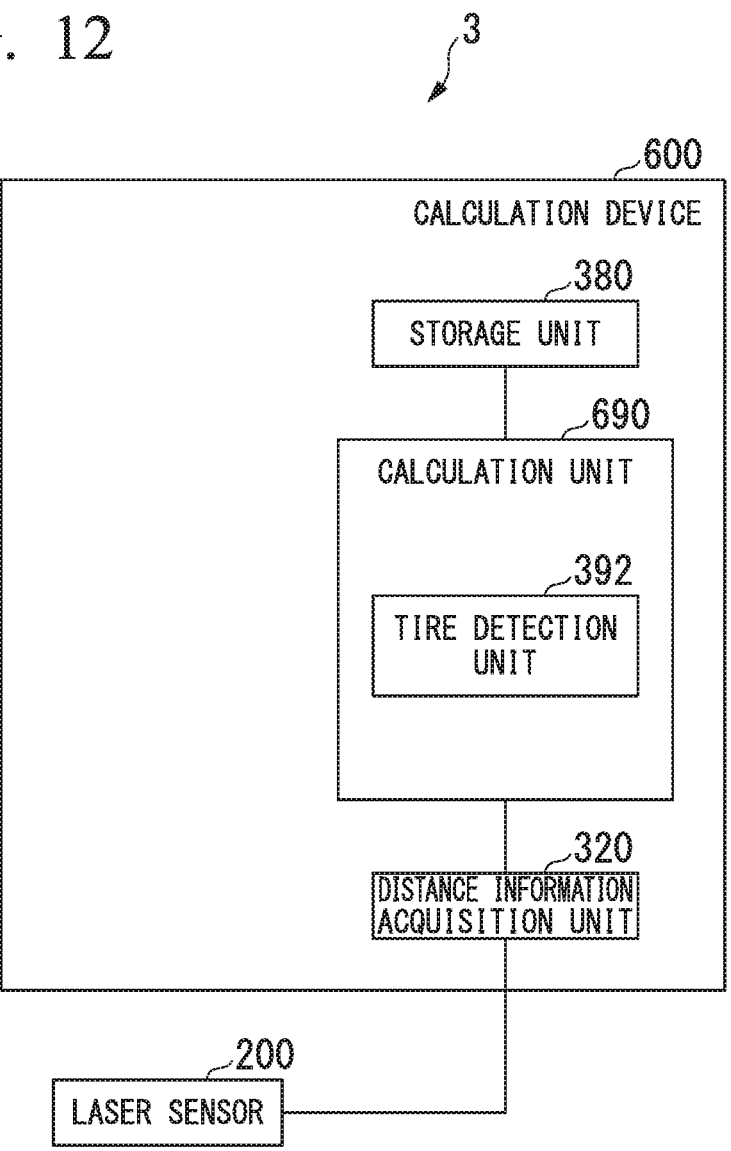

ABRASION INSPECTION APPARATUS, ABRASION INSPECTION METHOD, AND PROGRAM

RELATED APPLICATIONS

The present application is a National Phase of PCT/JP2015/082689, filed Nov. 20, 2015, and claims priority based on Japanese Patent Application No. 2015-038661, filed Feb. 27, 2015.

TECHNICAL FIELD

The present invention relates to an abrasion inspection apparatus, an abrasion inspection method, and a program.

Priority is claimed on Japanese Patent Application No. 2015-038661, filed Feb. 27, 2015, the content of which is incorporated herein by reference.

BACKGROUND ART

In railroad or new transportation systems or the like, inspection of abrasion of components used in vehicles is generally performed manually.

For example, traveling tires, pantographs, guide wheels, and branching wheels can be exemplified as consumable components used for vehicles of new transportation systems. For such components, operations of manually measuring depths of grooves of traveling tires, abrasion amounts of pantographs, diameters of guide wheels, and diameters of branching wheels using vernier calipers and manually inputting measurement results in databases are performed in some cases. In the measurement work and measurement result input work, labor costs are expended, and it is preferable for the work to be efficient.

In association with inspection of abrasion of components used for vehicles, a slider abrasion amount automatic measurement system disclosed in Patent Literature 1 sets a moving vehicle as a target in a garage and automatically measures an abrasion amount of a slider contactlessly in accordance with a detection signal for detecting a pantograph. In Patent Literature 1, this measurement is considered to contribute to safety and reduction in labor of a pantograph maintenance person.

CITATION LIST

Patent Literature

[Patent Literature 1]
  Japanese Patent No. 3171209

SUMMARY OF INVENTION

Technical Problem

It is also desirable to efficiently detect abrasion situations of components other than pantographs.

The present invention provides an abrasion inspection apparatus, an abrasion inspection method, and a program capable of efficiently detecting an abrasion situation of a component of a vehicle.

Solution to Problem

According to a first aspect of the present invention, there is provided an abrasion inspection apparatus including: a first imaging unit that is installed on a side of a track, a vehicle traveling along the track, a guide wheel being installed on a side of the vehicle, the first imaging unit imaging an inside of the track via a telecentric lens; a second imaging unit that is installed in a vehicle traveling direction with respect to the first imaging unit on the side of the track and images the inside of the track via a telecentric lens; an image acquisition unit that acquires an image which is an image of a boundary of the guide wheel captured by the first imaging unit and is an image of a boundary on a first direction side in the vehicle traveling direction and an image which is an image of the boundary of the guide wheel captured by the second imaging unit at the same time as the capturing of the image by the first imaging unit and is an image of a boundary on an opposite side to the first direction side; and a guide wheel detection unit that detects an abrasion situation of the guide wheel according to a position of a boundary indicated in the images acquired by the image acquisition unit.

The abrasion inspection apparatus may further include: a third imaging unit that is installed on the side of the track along which the vehicle in which the guide wheel is installed on the side travels and images the inside of the track via a telecentric lens; and a fourth imaging unit that is installed in the vehicle traveling direction with respect to the third imaging unit on the side of the track and images the inside of the track via a telecentric lens. A rotation mechanism that is in contact with the guide wheel and rotates the guide wheel may be installed on the side of the track. Both the first and second imaging units may be installed at positions at which the images of the boundary of the guide wheel are captured before the rotation mechanism rotates the guide wheel. Both the third and fourth imaging units may be installed at positions at which the images of the boundary of the guide wheel are captured after the rotation mechanism rotates the guide wheel. The image acquisition unit may further acquire an image which is an image of the boundary of the guide wheel captured by the third imaging unit and is an image of a boundary on the first direction side in the vehicle traveling direction and an image which is an image of the boundary of the guide wheel captured by the fourth imaging unit at the same time as the capturing of the image by the third imaging unit and is an image of the boundary on the opposite side to the first direction side. The guide wheel detection unit may detect the abrasion situation of the guide wheel according to a position of the boundary indicated in each of the image captured by the first imaging unit and the image captured by the second imaging unit and may further detect the abrasion situation of the guide wheel according to the image captured by the third imaging unit and a position of the boundary indicated in each image captured by the fourth imaging unit.

The abrasion inspection apparatus may further include: a distance measurement unit that is installed on a lower side of the track and measures a distance to an object located on an upper side which has an inclination in the vehicle traveling direction with respect to a vertical direction; and a tire detection unit that detects an abrasion situation of a traveling tire according to a distance which is measured by the distance measurement unit and is a distance between the distance measurement unit and the traveling tire installed on a lower side of the vehicle.

According to a second aspect of the present invention, there is provided an abrasion inspection apparatus including: a distance measurement unit that is installed on a lower side of a track of a transportation system in which a traveling tire is installed on a lower side of a vehicle, the distance measurement unit measuring a distance to an object located on an upper side which has an inclination in a vehicle traveling direction with respect to a vertical direction; and a tire detection unit that detects an abrasion situation of the traveling tire according to a distance which is measured by the distance measurement unit and is a distance between the distance measurement unit and the traveling tire of the vehicle.

According to a third aspect of the present invention, there is provided an abrasion inspection method of an abrasion inspection apparatus including a first imaging unit and a second imaging unit, the first imaging unit being installed on a side of a track, a vehicle traveling along the track, a guide wheel being installed on a side of the vehicle, the first imaging unit imaging an inside of the track via a telecentric lens, the second imaging unit being installed in a vehicle traveling direction with respect to the first imaging unit on the side of the track and images the inside of the track via a telecentric lens. The abrasion inspection method includes: acquiring an image which is an image of a boundary of the guide wheel captured by the first imaging unit and is an image of a boundary on a first direction side in the vehicle traveling direction and an image which is an image of the boundary of the guide wheel captured by the second imaging unit at the same time as the capturing of the image by the first imaging unit and is an image of a boundary on an opposite side to the first direction side; and detecting an abrasion situation of the guide wheel according to a position of a boundary indicated in the acquired images.

According to a fourth aspect of the present invention, there is provided a program for a computer used for an abrasion inspection apparatus including a first imaging unit and second imaging unit, the first imaging unit being installed on a side of a track, a vehicle traveling along the track, a guide wheel being installed on a side of the vehicle, the first imaging unit imaging an inside of the track via a telecentric lens, the second imaging unit being installed in the vehicle traveling direction with respect to the first imaging unit on the side of the track, the second imaging unit imaging the inside of the track via a telecentric lens, the program causing the computer to perform: acquiring an image which is an image of a boundary of the guide wheel captured by the first imaging unit and is an image of a boundary on a first direction side in the vehicle traveling direction and an image which is an image of the boundary of the guide wheel captured by the second imaging unit the same time as the capturing of the image by the first imaging unit and is an image of a boundary on an opposite side to the first direction side; and detecting an abrasion situation of the guide wheel according to a position of a boundary indicated in the acquired images.

Advantageous Effects of Invention

According to the foregoing abrasion inspection apparatus, abrasion inspection method, and program, it is possible to efficiently detect the abrasion situation of a component of a vehicle.

BRIEF DESCRIPTION OF DRAWINGS

FIG. 12 is a schematic block diagram showing a functional configuration of a second modification example of an abrasion inspection apparatus according the embodiment.

DESCRIPTION OF EMBODIMENTS

Hereinafter, embodiments of the invention will be described, but the following embodiments do not limit the invention described in the claims. Not all of the combinations of characteristics described in the embodiments are necessary to solve the problem solved by the invention.

Figure 1:
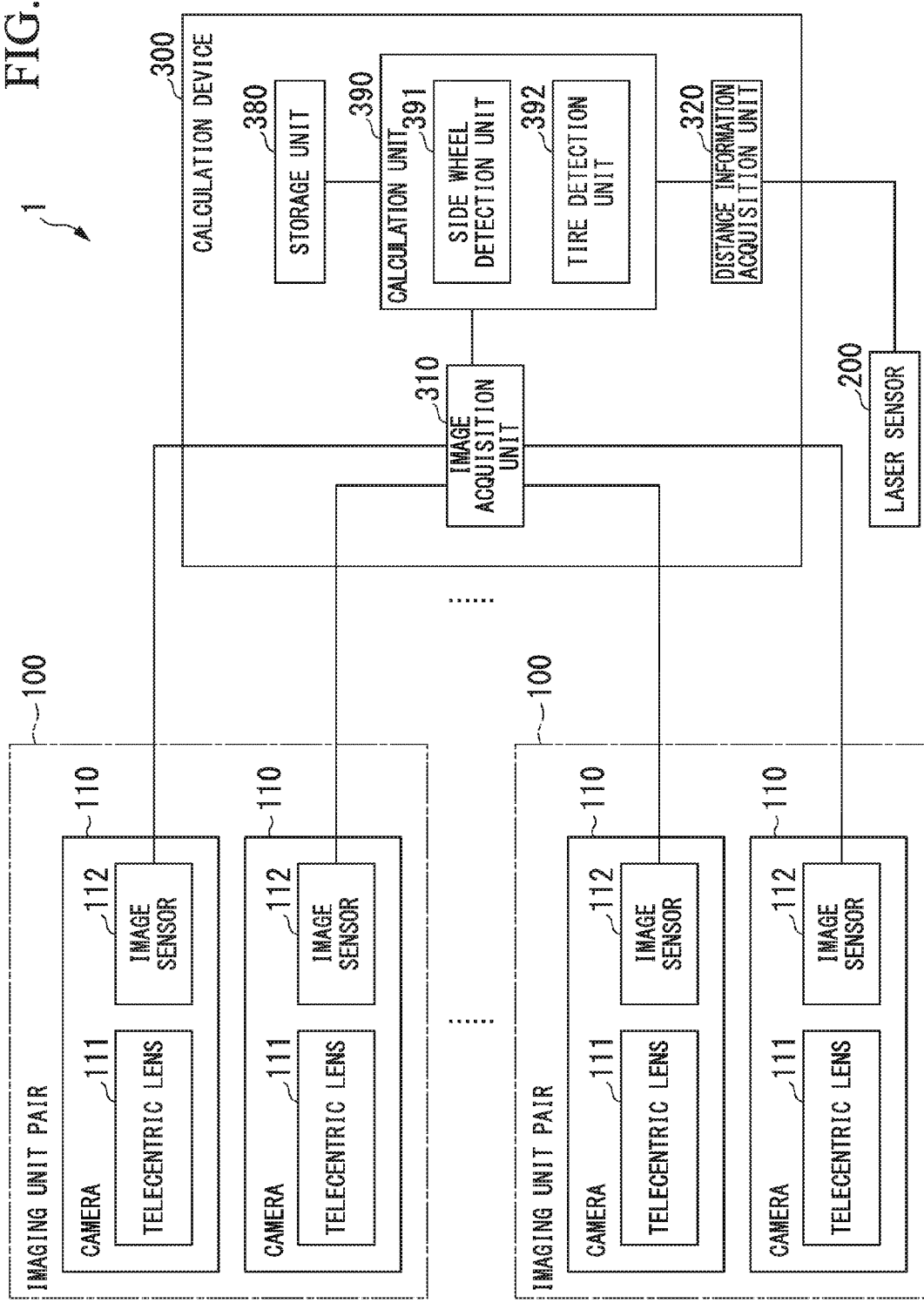
FIG. 1 is a schematic block diagram showing a functional configuration of an abrasion inspection apparatus according to an embodiment of the invention.

FIG. 1 is a schematic block diagram showing a functional configuration of an abrasion inspection apparatus according to an embodiment of the invention. In FIG. 1, an abrasion inspection apparatus 1 includes cameras 110, a laser sensor 200, and a calculation device 300. The camera 110 includes a telecentric lens 111 and an image sensor 112. The calculation device 300 includes an image acquisition unit 310, a distance information acquisition unit 320, a storage unit 380, and a calculation unit 390. The calculation unit 390 includes a guide wheel and branching wheel abrasion situation detection unit (hereinafter referred to as a side wheel detection unit) 391 and a tire abrasion situation detection unit (hereinafter referred to as a tire detection unit) 392.

Two cameras 110 are paired to configure an imaging unit pair 100. The number of imaging unit pairs 100 included in the abrasion inspection apparatus 1 may be 1 or more.

The abrasion inspection apparatus 1 is an apparatus that inspects abrasion of a guide wheel, abrasion of a branching wheel, and abrasion of a traveling tire installed in a vehicle of a transportation system. Here, a disposition example of the guide wheel, the branching wheel, and the traveling tire will be described with reference to FIG. 2.

Figure 2:
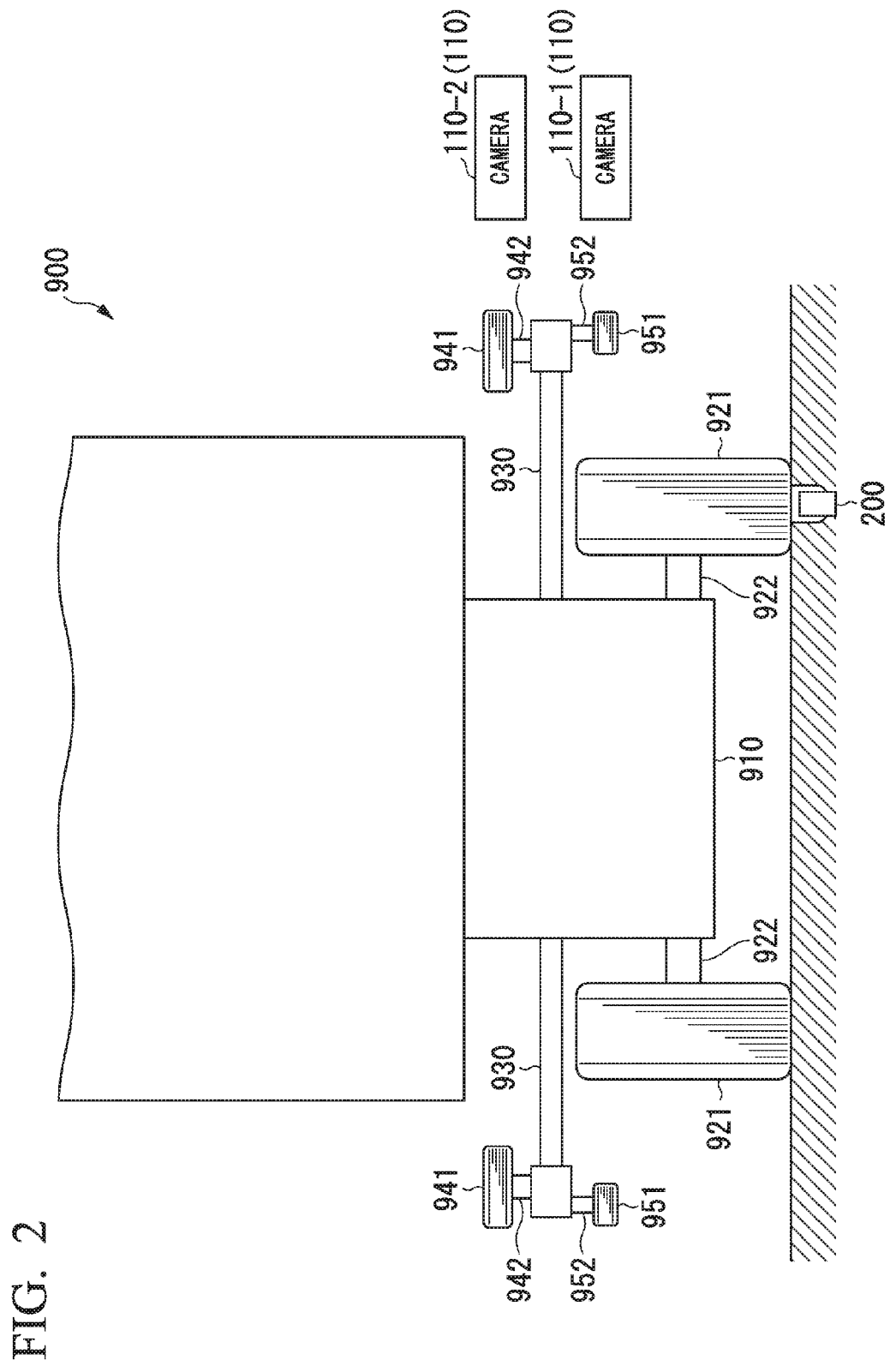
FIG. 2 is an exterior diagram showing a schematic exterior of a lower portion of a vehicle when viewed from the front side according to the embodiment.

FIG. 2 is an exterior diagram showing a schematic exterior of a lower portion of the vehicle when viewed from the front side. In a vehicle 900 shown in FIG. 2, traveling tires 921 are installed on the right and left of a vehicle body 910 via shafts 922 and are in contact with a road surface. Supports 930 are installed on the right and left of the vehicle body 910. In the supports 930, guide wheels 941 are installed via shafts 942. In the supports 930, branching wheels 951 are installed via shafts 952.

The traveling tires 921 rotate about the shafts 922 so that the vehicle 900 travels. The guide wheels 941 come into contact with guide rails installed on the sides of a track along which the vehicle 900 travels and limit a traveling direction of the vehicle 900 so that the vehicle 900 can travel along the track. The branching wheels 951 come into contact with guide rails installed on the sides of the track and limit the traveling direction of the vehicle 900 at a branching point of the track to control the traveling direction of the vehicle 900 at the branching point.

In this way, the traveling tires 921 are abraded by contact with the road surface. The guide wheels 941 and the branching wheels 951 are all abraded by contact with the guide rails.

FIG. 2 shows a disposition example of the cameras 110 and the laser sensor 200. As the cameras 110, cameras 110-1 and 110-2 are installed on the side of the track to image the inside of the track. The camera 110-1 is installed at a height at which the guide wheel 941 is imaged in the horizontal direction. An image captured by the camera 110-1 is used for the side wheel detection unit 391 to determine an abrasion situation of the guide wheel 941.

The camera 110-2 is installed at a height at which the branching wheel 951 is imaged in the horizontal direction. An image captured by the camera 110-2 is used for the side wheel detection unit 391 to determine an abrasion situation of the branching wheel 951.

The laser sensor 200 is installed in a hole formed on the road surface. As will be described below, the laser sensor 200 is installed in a direction which has an inclination in the traveling direction of the vehicle 900 with respect to the vertical direction.

The camera 110 is installed on the side of track along which the vehicle 900 travels and images the inside of the track. In particular, the camera 110-1 of the cameras 110 images the guide wheel 941, as described above. The camera 110-2 of the camera 110 images the branching wheel 951, as described above. The track in which the cameras 110 are installed may be a track along which the vehicle 900 normally travels or may be a dedicated inspection track.

The telecentric lens 111 forms an image of a subject by condensing light from the external world of the camera 110 at the position of the image sensor 112.

Figure 3:
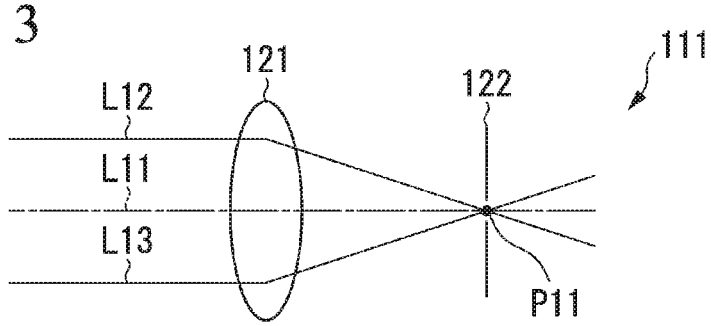
FIG. 3 is an explanatory diagram showing an example of a principal ray in a telecentric lens according to the embodiment.

FIG. 3 is an explanatory diagram showing an example of a principal ray in the telecentric lens 111. In FIG. 3, the telecentric lens 111 includes a lens body 121 and a diaphragm 122. The diaphragm 122 is installed at a position of a focal point P11 of the lens body 121, and thus a principal ray is telecentric on an object side parallel to a lens optical axis. In FIG. 3, a ray L11 indicates the lens optical axis and an example in which both rays L12 and L13 are principal rays is shown.

Both of the rays L12 and L13 indicating the principal rays are parallel to the ray L11 indicating the lens optical axis on the object side (a subject side).

The camera 110 includes the telecentric lens 111. Thus, even when the position of a subject is changed in a depth direction of the camera 110, the position of an image of the subject in a captured image is not changed.

In order for the side wheel detection unit 391 to determine an abrasion situation of the guide wheel 941, the camera 110 is considered to image the entire guide wheel 941 from the side of the guide wheel 941 and measure the size (diameter) of the guide wheel 941. However, in order to image the entire guide wheel 941, a telecentric lens with a large diameter is necessary as the telecentric lens 111. When the telecentric lens with a large diameter is used, installation cost is incurred and large space is considered to be necessary to install the camera 110.

Accordingly, in the abrasion inspection apparatus 1, the imaging unit pair 100 paired by two cameras 110 image boundaries of right and left sides of the guide wheels 941 at the same time. This point will be described with reference to FIG. 4.

Figure 4:
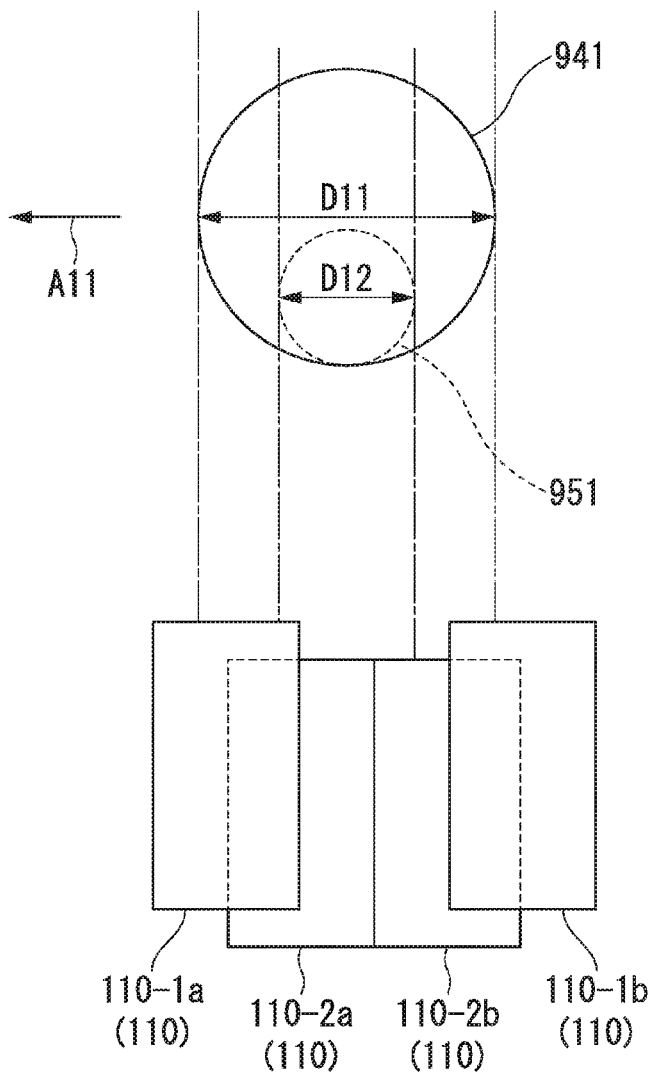
FIG. 4 is an explanatory diagram showing an example of imaged spots of a guide wheel and a branching wheel by a camera according to the embodiment.

FIG. 4 is an explanatory diagram showing an example of imaged spots of the guide wheel 941 and the branching wheel 951 by the camera 110. Cameras 110-1a and 110-1b image the guide wheel 941. Cameras 110-2a and 110-2b image the branching wheel 951. An arrow A11 indicates a traveling direction of the vehicle 900.

Any one of the cameras 110-1a and 110-1b corresponds to a first imaging unit and captures an image which is an image of a boundary of the guide wheel 941 and is an image of a boundary on a first direction side in a vehicle traveling direction. The other of the camera 110-1a and 110-1b corresponds to a second imaging unit and captures an image which is an image of the boundary of the guide wheel 941 and is an image of the boundary on an opposite side to the first direction side. Specifically, the camera 110-1a captures an image of a boundary of the front side in the vehicle traveling direction of the guide wheel 941 and the camera 110-1b captures an image of a boundary of the rear side in the vehicle traveling direction of the guide wheel 941. The camera 110-1a is installed to be separated from the camera 110-1b in the vehicle traveling direction. The cameras 110-1a and 110-1b perform imaging at the same time. However, the imaging timing of the camera 110-1a and the imaging timing of the camera 110-1b is not necessarily precisely simultaneous, but may be substantially simultaneous.

A distance D11 between boundaries of both sides of the side wheel detection unit 391 can be calculated from an image captured by the camera 110-1a and an image captured by the camera 110-1b. Specifically, the side wheel detection unit 391 detects images of the boundaries of the guide wheel 941 from the image captured by the camera 110-1a and the image captured by the camera 110-1b. The side wheel detection unit 391 calculates the distance D11 according to a positional relation of the cameras 110-1a and 110-1b (in particular, the distance between the cameras 110-1a and 110-1b) and the position of the detected image of the boundary in the image which is known at the magnification (the scaling ratio) of the image.

The cameras 110-1a and 110-1b include the telecentric lenses 111. Thus, the side wheel detection unit 391 can calculate the distance D11 without needing to correct the distance according to the position of the guide wheel 941 in the depth direction when viewed from the camera 110.

The cameras 110-2a and 110-2b capture images which are images of a boundary of the branching wheel 951 and are images of a boundary on the first direction side in the vehicle traveling direction and capture images which are images of a boundary of the branching wheel 951 and are images of a boundary on the opposite side to the first direction side. Specifically, the camera 110-2a captures an image of a boundary on the front side in the vehicle traveling direction of the branching wheel 951 and the camera 110-2b captures an image of a boundary on the rear side in the vehicle traveling direction of the branching wheel 951. The camera 110-2a is installed in the vehicle traveling direction with respect to the camera 110-2b.

A distance D12 between the boundaries of both sides of the branching wheel 951 can be calculated from an image captured by the camera 110-2a and an image captured by the camera 110-2b. Specifically, the side wheel detection unit 391 detects images of the boundaries of the branching wheel 951 from the image captured by the camera 110-2a and the image captured by the camera 110-2b. The side wheel detection unit 391 calculates the distance D12 according to a positional relation of the cameras 110-2a and 110-2b (in particular, the distance between the cameras 110-2a and 110-2b) and the position of the detected image of the boundary in the image which is known at the magnification (the scaling ratio) of the image.

The cameras 110-1a and 110-1b include the telecentric lenses 111. Thus, the side wheel detection unit 391 can calculate the distance D12 without necessarily correcting the distance according to the position of the guide wheel 941 in the depth direction when viewed from the camera 110.

Figure 5:
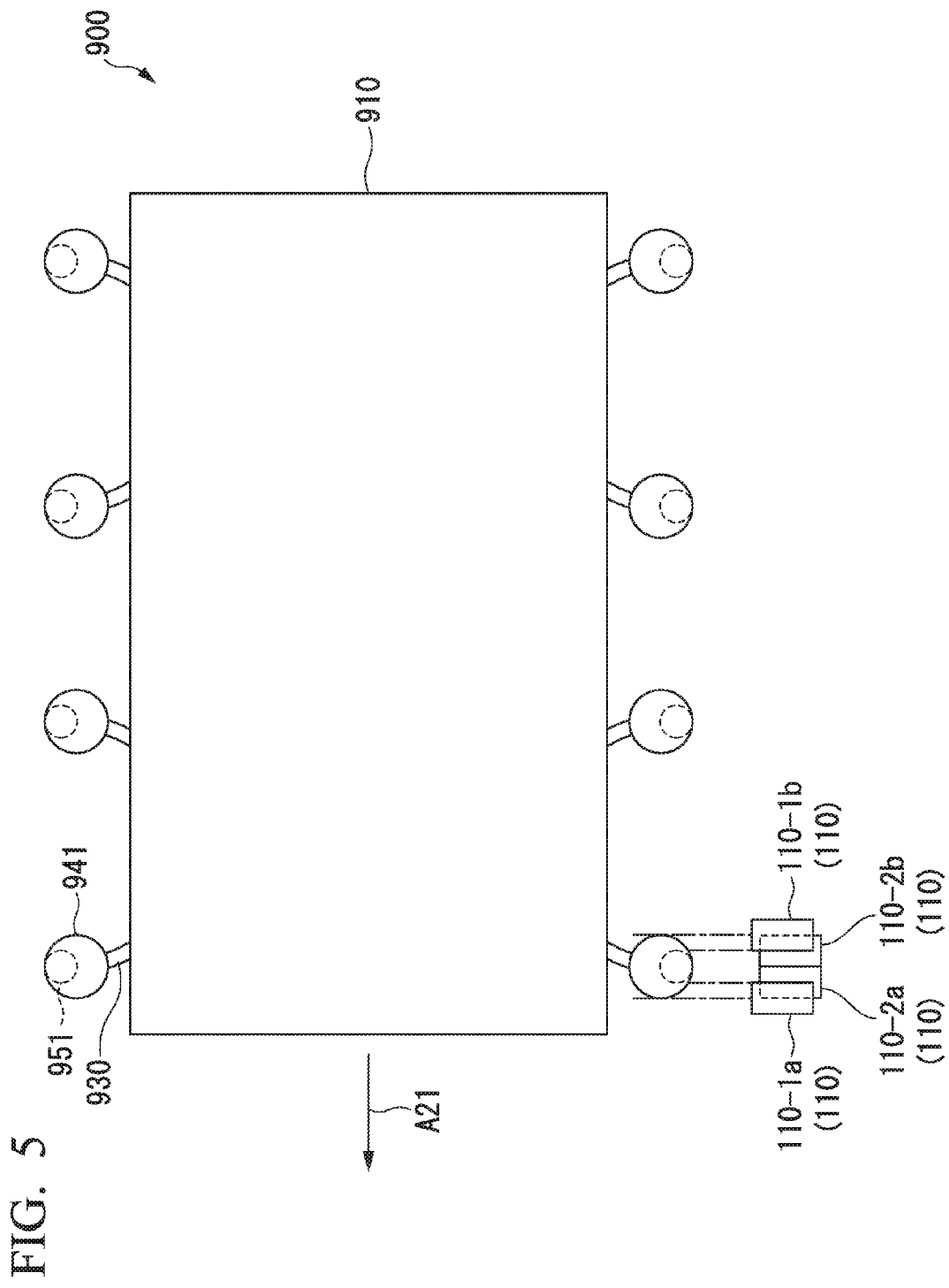
FIG. 5 is an exterior diagram showing a schematic exterior of the vehicle when viewed from the upper side according to the embodiment.

FIG. 5 is an exterior diagram showing a schematic exterior of the vehicle 900 when viewed from the upper side. As described with reference to FIG. 2, the supports 930 are installed to the right and left of the vehicle body 910. The guide wheels 941 and the branching wheels 951 are installed in the supports 930.

As the cameras 110, the cameras 110-1a, 110-1b, 110-2a, and 110-2b are installed on the sides of the track to image the inside of the track. As described with reference to FIG. 4, the cameras 110-1a and 110-1b image the guide wheels 941. The cameras 110-2a and 110-2b image the branching wheels 951. An arrow A21 indicates a traveling direction of the vehicle 900.

The plurality of guide wheels 941 and the plurality of branching wheels 951 are installed on each of the sides of the vehicle body 910. For example, the cameras 110-1a and 110-1b may capture images of the boundary whenever the boundary of the guide wheel 941 is located in front of the cameras 110. For example, the cameras 110-1a and 110-1b continuously perform imaging. Thus, the side wheel detection unit 391 can determine abrasion situations of the plurality of guide wheels 941. For example, the cameras 110-2a and 110-2b may capture images of the boundary whenever the boundary of the branching wheel 951 is located in front of the cameras 110. For example, the cameras 110-2a and 110-2b continuously perform imaging. Thus, the side wheel detection unit 391 can determine the abrasion situations of the plurality of branching wheels 951.

FIG. 5 shows an example of a case in which the cameras 110 are installed only on one of the sides of the track, but the cameras 110 may be installed on both sides of the track.

The image sensor 112 photoelectrically converts light condensed by the telecentric lens 111 to generate image data.

The laser sensor 200 corresponds to an example of a distance measurement unit and measures a distance to an object which is in a laser radiation direction. In particular, the laser sensor 200 measures a distance between the laser sensor 200 and the surface of the traveling tire 921 when the traveling tire 921 is in the laser radiation direction. At this time, the laser sensor 200 radiates a laser beam that expands in a width direction of the traveling tire 921 to measure a distance to each unit.

Figure 6:
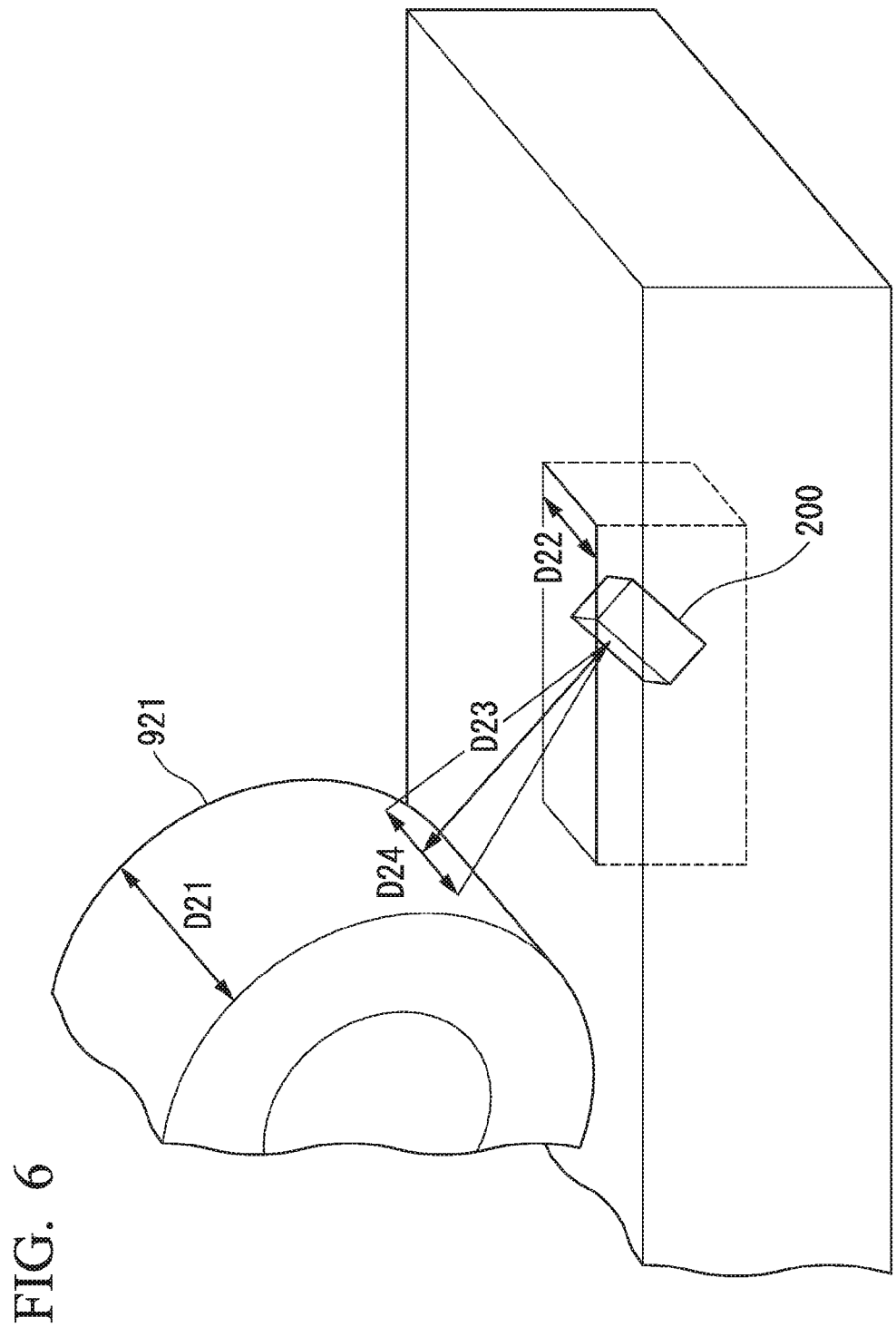
FIG. 6 is an explanatory diagram showing an installation example of a laser sensor according to the embodiment.

FIG. 6 is an explanatory diagram showing an installation example of the laser sensor 200. In FIG. 6, a hole with a width D22 narrower than a width D21 of the traveling tire 921 is installed at a position at which the traveling tire 921 travels on the road surface and the laser sensor 200 is installed in the hole. The laser sensor 200 radiates a laser beam with a width D24 that expands on the traveling tire 921 to measure a distance between the laser sensor 200 and each portion. Accordingly, the laser sensor 200 measures a distance between the laser sensor 200 and each portion in a line form in the width direction of the traveling tire 921.

For example, the width D21 of the traveling tire 921 is about 300 millimeters (mm) and the width D22 of the hole is about 50 millimeters. The laser sensor 200 measures a distance to each portion with the width D24 of about 250 millimeters at the position of the traveling tire 921 from which a radiation distance of the laser beam is about 450 millimeters.

By obtaining a change amount in the width direction of the traveling tire 921 (a difference from the neighbor) with respect to the distance measured by the laser sensor 200, it is possible to detect unevenness on the surface of the traveling tire 921.

Thus, the tire detection unit 392 calculates the depth of a groove formed on the surface of the traveling tire 921.

As shown in FIG. 6, the laser sensor 200 is installed on a lower side of the track and is installed to measure a distance to the traveling tire 921 located on an upper side which has an inclination in the vehicle traveling direction with respect to the vertical direction. In this way, the laser sensor 200 measures a distance to the traveling tire 921 located in a direction which has an inclination in the vehicle traveling direction with respect to the vertical direction. As a result, the laser sensor 200 can perform the measurement in a state in which the traveling tire 921 is not in contact with the ground, and accordingly, in a state in which the traveling tire 921 is weightless.

Thus, the tire detection unit 392 can calculate the depth of the groove on the traveling tire 921 more accurately than when the traveling tire 921 is weighted.

The calculation device 300 detects the abrasion situation of the guide wheel 941 and an abrasion situation of the branching wheel 951 according to images captured by the cameras 110. The calculation device 300 detects the abrasion situation of the traveling tire 921 according to the distance detected by the laser sensor 200.

The calculation device 300 is configured using, for example, a computer.

The image acquisition unit 310 acquires an image captured by the camera 110. In particular, the image acquisition unit 310 acquires images which are images of the boundary of the guide wheel 941 captured by the two cameras 110 configuring the imaging unit pair 100 and are images of the boundary on the first direction side in the vehicle traveling direction, and images of the boundary on the opposite side to the first direction side. The image acquisition unit 310 acquires images which are images of the boundary of the branching wheel 951 captured by two cameras 110 configuring the imaging unit pair 100 and are images of the boundary on the first direction side in the vehicle traveling direction, and images of the boundary on the opposite side to the first direction side.

The image acquisition unit 310 is configured as, for example, a communication circuit that communicates with each camera 110 and receives image data.

The distance information acquisition unit 320 acquires distance information indicating a result of distance measurement by the laser sensor 200. The distance information acquisition unit 320 is configured as, for example, a communication circuit that communicates with the laser sensor 200 and receives distance information.

The storage unit 380 is configured using a storage device included in the calculation device 300 and stores various kinds of information. In particular, the storage unit 380 stores image data acquired by the image acquisition unit 310 and distance information acquired by the distance information acquisition unit 320.

The calculation unit 390 controls each unit of the calculation device 300 and performs various processes such as various kinds of calculations. The calculation unit 390 is configured, for example, when a central processing unit (CPU) included in the calculation device 300 reads a program from the storage unit 380 and executes the program.

The side wheel detection unit 391 corresponds to an example of a guide wheel abrasion situation detection unit (hereinafter referred to as a guide wheel detection unit) and detects the abrasion situation of the guide wheel 941 according to the position of the boundary of the guide wheel 941 indicated in an image acquired by the image acquisition unit 310. More specifically, the side wheel detection unit 391 calculates a length between the boundaries according to the images of the boundaries of both sides of the guide wheel 941 captured by two cameras 110 configuring the imaging unit pair 100, compares the obtained length to a threshold, and determines whether a warning is output. The side wheel detection unit 391 also detects the abrasion situation of the branching wheel 951 as in the case of the guide wheel 941.

Figure 7:
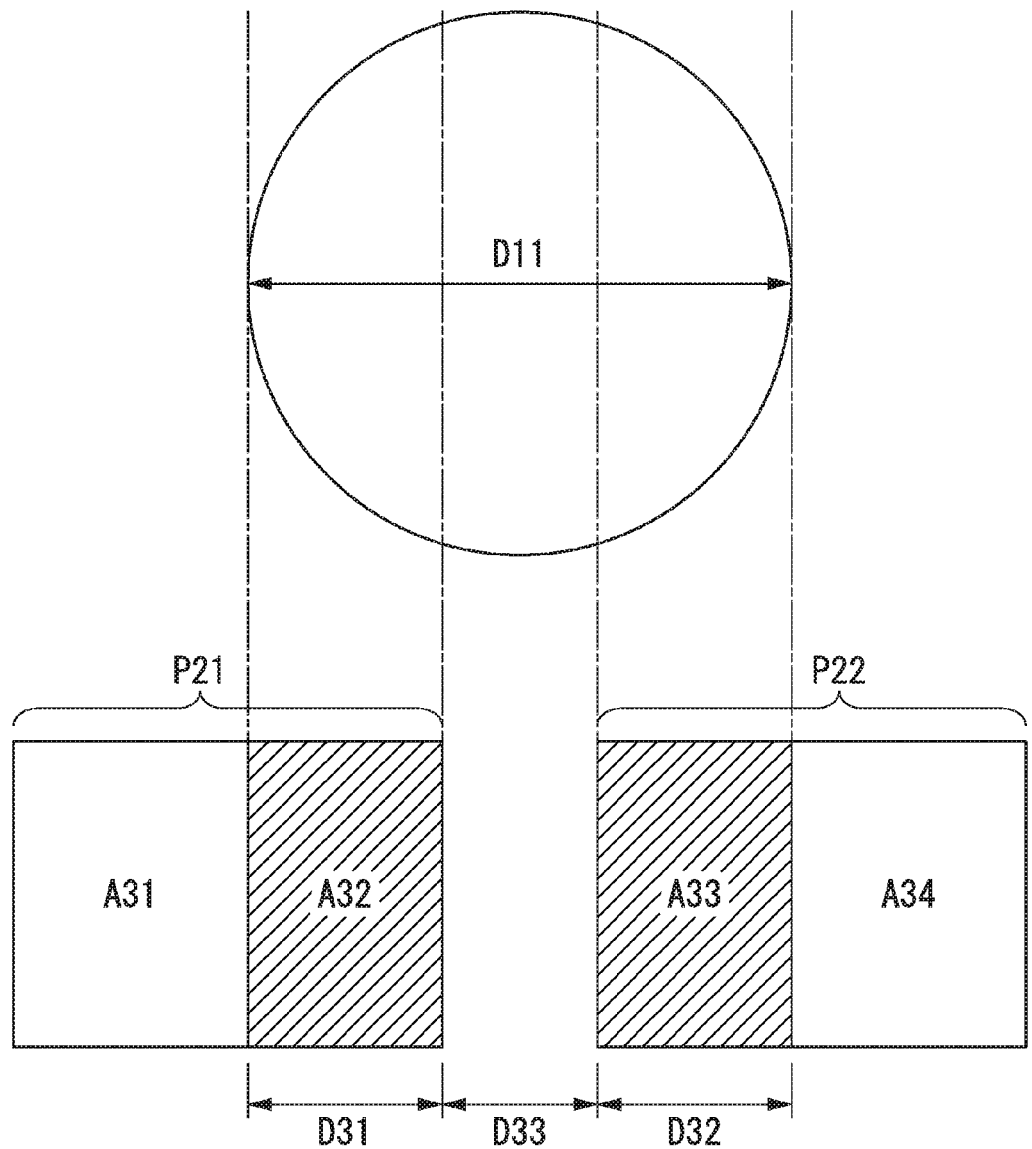
FIG. 7 is an explanatory diagram showing an example of a correspondence relation between an image captured by the camera and the guide wheel according to the embodiment.

FIG. 7 is an explanatory diagram showing an example of a correspondence relation between an image captured by the camera 110 and the guide wheel 941. In FIG. 7, an image P21 is an example of an image which is an image of the boundary of the guide wheel 941 captured by the camera 110 (for example, the camera 110-1a in FIG. 4) and is an image of the boundary on the first direction side in the vehicle traveling direction. In the image P21, a region A31 is a region other than an image of the guide wheel 941 and a region A32 is a region of the image of the guide wheel 941. A distance D31 indicates an actual width of a portion equivalent to the region A32 in the guide wheel 941. The side wheel detection unit 391 stores a magnification (a scaling ratio) of an image captured by the camera 110 in advance, detects the width of the region A32 in the image P21, and calculates the distance D31 by dividing the obtained width by the magnification.

An image P22 is an example of an image which is an image of the boundary on the other side of the vehicle traveling direction in the guide wheel 941 captured by the camera 110 (for example, the camera 110-1b in FIG. 4). In the image P22, a region A33 is a region of the image of the guide wheel 941 and a region A34 is a region other than an image of the guide wheel 941. A distance D32 indicates an actual width of a portion equivalent to the region A33 in the guide wheel 941. The side wheel detection unit 391 detects the width of the region A33 in the image P22 and calculates the distance D32 by dividing the obtained width by the magnification of the image P22.

A distance D33 is a distance equivalent to a gap between the images P21 and P22. The distance D33 is a fixed distance corresponding to a distance at which two cameras 110 are installed away from each other. For example, a user of the abrasion inspection apparatus 1 registers the distance D33 and the storage unit 380 stores the distance D33 in advance.

The side wheel detection unit 391 calculates the width (the distance D11) between the boundaries of the guide wheel 941 by calculating the distances D31 and D32, reading the distance D33 from the storage unit 380, and calculating a sum of the distances D31, D32, and D33. The distance D11 is equivalent to the diameter of the guide wheel 941.

The side wheel detection unit 391 compares the calculated distance D11 to a predetermined threshold and outputs a warning indicating that the guide wheel 941 is abraded when it is determined that the distance D11 is equal to or less than the threshold. The user of the abrasion inspection apparatus 1 determines a value according to a specification (in particular, the diameter of the guide wheel 941 which is a new product) of the guide wheel 941 as the threshold and registers the threshold. The storage unit 380 stores the threshold in advance.

Various output aspects of the warning by the side wheel detection unit 391 may be used. For example, a display device included in the calculation device 300 may display a warning output by the side wheel detection unit 391. Alternatively, the warning output by the side wheel detection unit 391 may be transmitted to another device by the calculation device 300.

The side wheel detection unit 391 may output a value indicating the degree of abrasion of the guide wheel 941, for example, by outputting the distance D11 equivalent to the diameter of the guide wheel 941 in addition to or instead of an output of the warning as evaluation of the abrasion situation of the guide wheel 941.

The side wheel detection unit 391 calculates a distance between the boundaries of the branching wheel 951 and compares the distance to a predetermined threshold. Then, when it is determined that the distance between the boundaries of the branching wheel 951 is equal to or less than the threshold, the side wheel detection unit 391 outputs a warning indicating that the branching wheel 951 is abraded.

For the branching wheel 951, various output aspects of the warning by the side wheel detection unit 391 may also be used, as in the case of the guide wheel 941.

For the branching wheel 951, the side wheel detection unit 391 may also output a value indicating the degree of abrasion of the branching wheel 951, as in the case of the guide wheel 941.

The tire detection unit 392 detects the abrasion situation of the traveling tire 921 according to a distance between the laser sensor 200 and the surface of the traveling tire 921 measured by the laser sensor 200. More specifically, as described with reference to FIG. 6, the laser sensor 200 measures a distance between the laser sensor 200 and the surface of the traveling tire 921 on a line form in the width direction of the traveling tire 921. Then, the tire detection unit 392 detects unevenness on the surface of the traveling tire 921 by obtaining a change amount (a difference from the neighbor) in the width direction of the traveling tire 921 with respect to a distance measured by the laser sensor 200. Thus, the tire detection unit 392 calculates a depth of a groove formed on the surface of the traveling tire 921. Then, the tire detection unit 392 compares the obtained depth of the groove to a predetermined threshold and outputs a warning indicating that the traveling tire 921 is abraded when it is determined that the depth of the groove is equal to or less than the threshold. The user of the abrasion inspection apparatus 1 determines a value according to a specification (in particular, the depth of the groove of the traveling tire 921 which is a new product) of the traveling tire 921 and registers the threshold. The storage unit 380 stores the threshold in advance.

Various output aspects of the warning by the tire detection unit 392 may be used. For example, the display device included in the calculation device 300 may display a warning output by the tire detection unit 392. Alternatively, the warning output by the tire detection unit 392 may be transmitted to another device by the calculation device 300.

The tire detection unit 392 may output a value indicating the degree of abrasion of the traveling tire 921, for example, by outputting the depth of the groove of the traveling tire 921 in addition to or instead of an output of the warning as evaluation of the abrasion situation of the traveling tire 921.

Next, an operation of the calculation device 300 will be described with reference to FIGS. 8 and 9.

Figure 8:
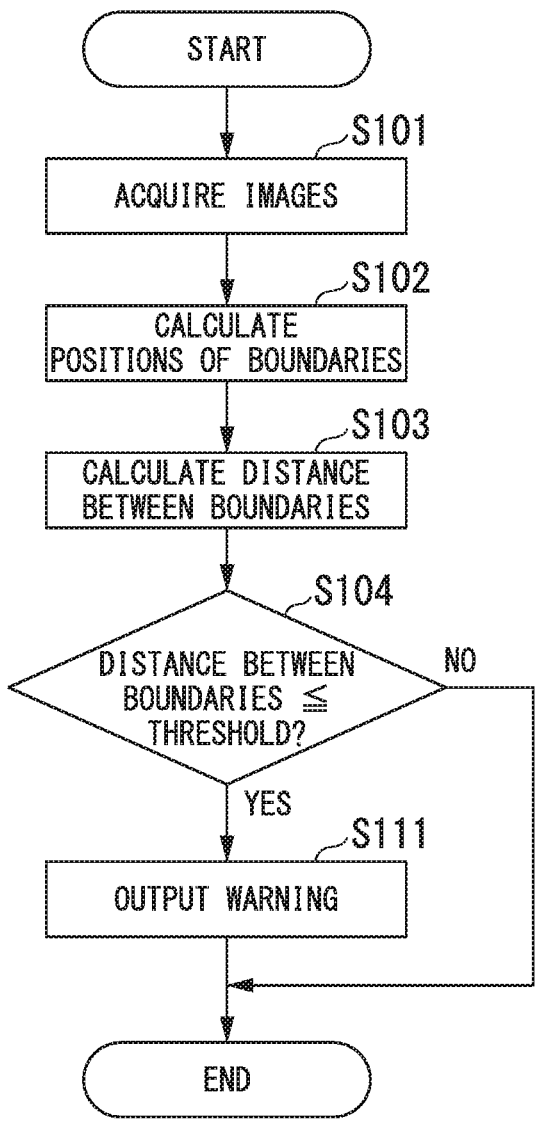
FIG. 8 is a flowchart showing an example of a process procedure in which a calculation device detects the abrasion situation of the guide wheel according to the embodiment.

FIG. 8 is a flowchart showing an example of a process procedure in which the calculation device 300 detects the abrasion situation of the guide wheel 941. The calculation device 300 performs a process of FIG. 8, for example, at each predetermined period.

In the process of FIG. 8, the image acquisition unit 310 acquires the images of the boundary of the guide wheel 941 captured by two cameras 110 configuring the imaging unit pair 100 (step S101). As described above, the image acquisition unit 310 acquires two images, the image which is the image of the boundary of the guide wheel 941 and the image of the boundary on the first direction side in the vehicle traveling direction, and the image of the boundary on the opposite side to the first direction side.

Next, the side wheel detection unit 391 detects the positions of the images of the boundaries in the images in the two images obtained in step S101 (step S102). The side wheel detection unit 391 detects the images of the boundaries in the images by, for example, image matching and obtains coordinates indicating the positions of the detected images of the boundaries in the images.

Then, the side wheel detection unit 391 calculates the distance (the distance D11 in FIG. 4) between the boundaries of the guide wheel 941, as described with reference to FIG. 4 (step S103).

Then, the side wheel detection unit 391 determines whether the distance between the boundaries obtained in step S103 is equal to or less than the threshold (step S104). When the side wheel detection unit 391 determines that the distance between the boundaries is greater than the threshold (NO in step S104), the process of FIG. 8 ends.

Conversely, when the side wheel detection unit 391 determines that the distance between the boundaries is equal to or less than the threshold (YES in step S104), the side wheel detection unit 391 outputs the warning indicating abrasion of the guide wheel 941 (step S111).

After step S111, the process of FIG. 8 ends.

The process procedure in which the calculation device 300 detects the abrasion situation of the branching wheel 951 is the same as the case of the guide wheel 941.

Figure 9:
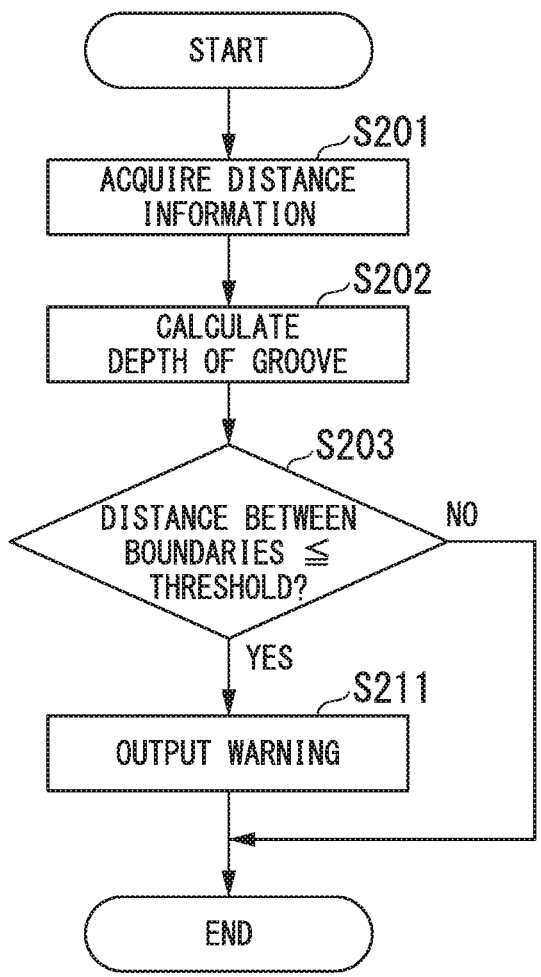
FIG. 9 is a flowchart showing an example of a process procedure in which the calculation device detects the abrasion situation of a traveling tire according to the embodiment.

FIG. 9 is a flowchart showing an example of a process procedure in which the calculation device 300 detects the abrasion situation of the traveling tire 921. The calculation device 300 performs the process of FIG. 9, for example, at each predetermined period.

In the process of FIG. 9, the distance information acquisition unit 320 acquires distance information obtained when the laser sensor 200 measures the distance (step S201).

Subsequently, the tire detection unit 392 calculates the depth of the groove formed on the surface of the traveling tire 921, as described above, according to the distance information obtained in step S201 (step S202).

Then, the tire detection unit 392 determines whether the depth of the groove obtained in step S202 is equal to or less than the threshold (step S203). When the tire detection unit 392 determines that the depth of the groove is greater than the threshold (NO in step S203), the process of FIG. 9 ends.

Conversely, when the tire detection unit 392 determines that the depth of the groove is equal to or less than the threshold (YES in step S203), the tire detection unit 392 outputs the warning indicating abrasion of the traveling tire 921 (step S211).

After step S211, the process of FIG. 9 ends.

As described above, one of the cameras 110 configuring the imaging unit pair 100 is installed on the side of the track along which the vehicle 900 travels and is installed to image the inside of the track via the telecentric lens 111. The other of the cameras 110 configuring the imaging unit pair 100 is installed in the vehicle traveling direction with respect to the one camera 110 on the side of the track along which the vehicle 900 travels and is installed to image the inside of the track via the telecentric lens 111.

The image acquisition unit 310 acquires the image which is the image of the boundary of the guide wheel 941 captured by the camera 110 and is the image of the boundary on the first direction side in the vehicle traveling direction, and the image which is the image of the boundary of the guide wheel 941 and is the image of the boundary on the opposite side to the first direction side.

Then, the side wheel detection unit 391 detects the abrasion situation of the guide wheel 941 according to the positions of the boundaries shown in the images captured by the image acquisition unit 310.

Thus, the abrasion inspection apparatus 1 can automatically monitor the abrasion situation of the guide wheel 941. From this viewpoint, the abrasion inspection apparatus 1 can efficiently detect the abrasion situation of the guide wheel 941 which is one of the components of the vehicle.

The camera 110 includes the telecentric lens 111, and thus the side wheel detection unit 391 can calculate the distance between the boundaries of the guide wheel 941 without performing correction according to the position of a subject in the depth direction in the images captured by the cameras 110. From this viewpoint, it is possible to prevent a process load of the side wheel detection unit 391 from increasing.

Two cameras 110 image the boundaries of the guide wheel 941, and thus can capture the boundaries of both sides of the guide wheel 941 without using a telecentric lens with a large diameter. From the viewpoint that it is not necessary to use a telecentric lens with a large diameter, it is possible to suppress installation cost and prevent an increase in the size of the camera 110.

The laser sensor 200 is installed on the lower side of the track of the vehicle 900 and measures a distance to an object located on the upper side which has an inclination in the vehicle traveling direction with respect to the vertical direction. The tire detection unit 392 detects the abrasion situation of the traveling tire 921 according to the distance between the laser sensor 200 and the traveling tire 921 measured by the laser sensor 200.

Thus, the abrasion inspection apparatus 1 can automatically monitor an abrasion situation of the traveling tire 921. From this viewpoint, the abrasion inspection apparatus 1 can efficiently inspect the abrasion situation of the traveling tire 921 which is one of the components of the vehicle.

The laser sensor 200 measures a distance to the traveling tire 921 on the upper side which has an inclination in the vehicle traveling direction with respect to the vertical direction. The laser sensor 200 can measure the distance in a state in which the traveling tire 921 is not in contact with the ground, and accordingly, in a state in which the traveling tire 921 is weightless. Thus, the tire detection unit 392 can calculate the depth of the groove on the traveling tire 921 more accurately than when the traveling tire 921 is weighted.

The side wheel detection unit 391 may detect the degree of abrasion of the guide wheel 941 in a plurality of directions of the guide wheel 941 so that uneven abrasion of the guide wheel 941 can be detected.

Figure 10:
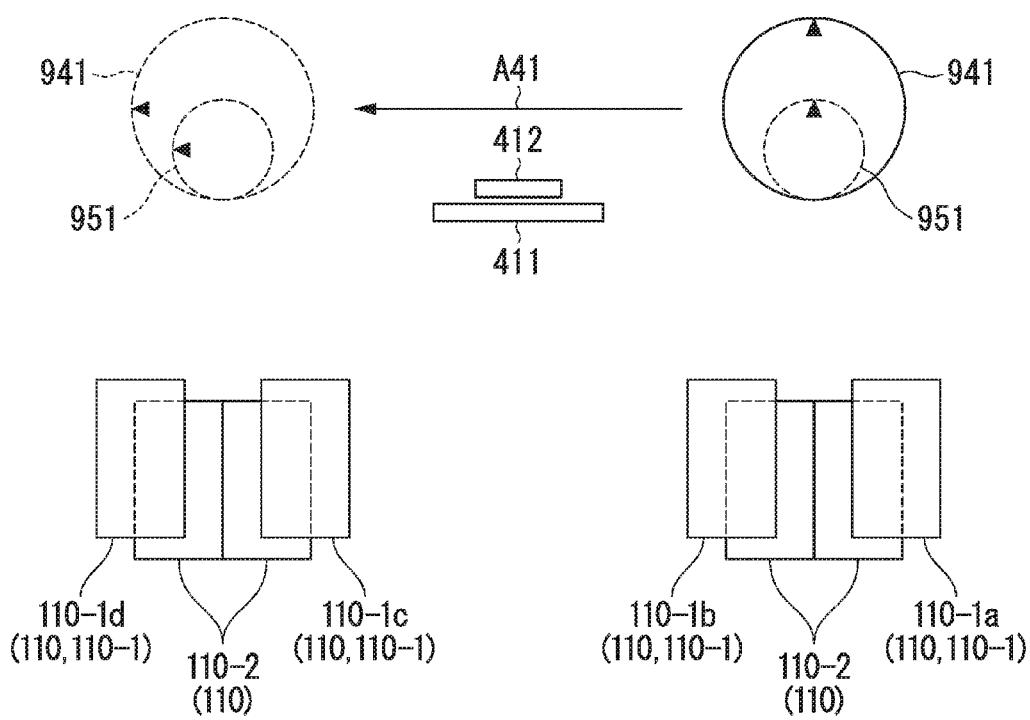
FIG. 10 is an explanatory diagram showing an example of a change in the direction of the guide wheel according to the embodiment.

FIG. 10 is an explanatory diagram showing an example of a change in the direction of the guide wheel 941. In FIG. 10, an arrow A41 indicates a traveling direction of the vehicle 900. A plate 411 for rotating the guide wheel 941 and a plate 412 for rotating the branching wheel 951 are installed on a side of the track of the vehicle 900. With traveling of the vehicle 900, the guide wheel 941 comes into contact with the plate 411 and rotates, and thus the direction of the guide wheel 941 is changed. With traveling of the vehicle 900, the branching wheel 951 comes into contact with the plate 412 and rotates, and thus the direction of the branching wheel 951 is changed. In the example of FIG. 10, the directions of the guide wheel 941 and the branching wheel 951 are changed 90 degrees. The plate 411 corresponds to an example of a rotation mechanism.

Before and after the direction of the guide wheel 941 is changed, two cameras 110-1 are installed to image boundaries of both sides of the guide wheel 941, and thus a total of four cameras are installed.

Of the four cameras 110-1, two cameras 110-1 (a camera 110-1a and a camera 110-1b) performing imaging in a state before the guide wheel 941 comes into contact with the plate 411 and rotates and thus the direction of the guide wheel 941 is changed correspond to examples of the first and second imaging units. Of the four cameras 110-1, two cameras 110-1 (a camera 110-1c and a camera 110-1d) performing imaging in a state after the guide wheel 941 comes into contact with the plate 411 and rotates and thus the direction of the guide wheel 941 is changed correspond to examples of the third and fourth imaging units.

The side wheel detection unit 391 detects the abrasion situation according to images of the boundaries captured by the cameras 110-1a and 110-1b in the state before the guide wheel 941 rotates. Further, the side wheel detection unit 391 detects the abrasion situation according to images of the boundaries captured by the cameras 110-1c and 110-1d in the state after the guide wheel 941 rotates.

In this way, the camera 110-1 images the boundaries of both sides of the guide wheel 941 before and after the direction of the guide wheel 941 is changed. Thus, the side wheel detection unit 391 can calculate the length between the boundaries in a plurality of directions (two directions in the example of FIG. 10) of the guide wheel 941. Thus, even when the guide wheel 941 is unevenly abraded, the side wheel detection unit 391 is highly likely to detect abrasion of the guide wheel 941. For example, the side wheel detection unit 391 is highly likely to determine whether the magnitude of the abrasion of the guide wheel 941 is equal to or greater than a predetermined magnitude.

The side wheel detection unit 391 may detect the degree of abrasion of the guide wheel 941 in three or more directions of the guide wheels 941. Thus, even when the guide wheel 941 is unevenly abraded, the side wheel detection unit 391 is even more likely to detect abrasion of the guide wheel 941.

The side wheel detection unit 391 may also detect the degree of abrasion in a plurality of directions of the branching wheel 951, as in the case of the guide wheel 941.

In FIG. 10, before and after the direction of the branching wheel 951 is changed, two cameras 110-2 are installed to image boundaries of both sides of the branching wheel 951, and thus a total of four cameras are installed.

Before and after the direction of the branching wheel 951 is changed, the camera 110-2 images the boundaries of both sides of the branching wheel 951, and thus the side wheel detection unit 391 can calculate a length between the boundaries in a plurality of directions (two directions in the example of FIG. 10) of the branching wheel 951. Thus, even when the branching wheel 951 is unevenly abraded, the side wheel detection unit 391 is highly likely to detect abrasion of the branching wheel 951.

The side wheel detection unit 391 may detect the degree of abrasion of the branching wheel 951 in three or more directions of the branching wheel 951. Thus, even when the branching wheel 951 is unevenly abraded, the side wheel detection unit 391 is even more likely to detect abrasion of the branching wheel 951.

The abrasion inspection apparatus may not necessarily detect all of the abrasion of the guide wheel 941, the abrasion of the branching wheel 951, and the abrasion of the traveling tire 921 and may detect the abrasion of one or two thereof.

Figure 11:
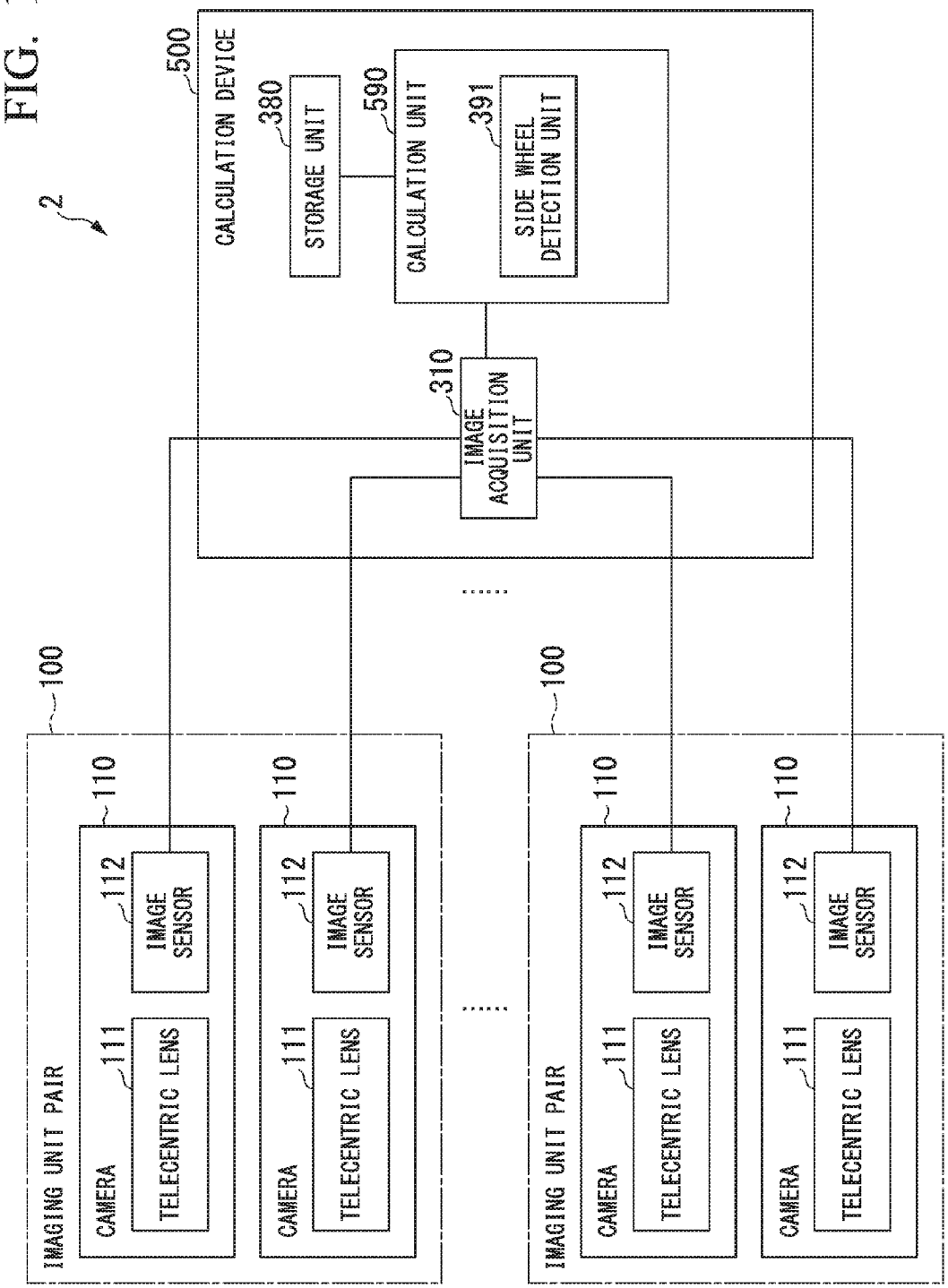
FIG. 11 is a schematic block diagram showing a functional configuration of a first modification example of an abrasion inspection apparatus according the embodiment.

FIG. 11 is a schematic block diagram showing a functional configuration of an abrasion inspection apparatus 2 which is a first modification example of the abrasion inspection apparatus 1 according to the embodiment. In FIG. 11, the abrasion inspection apparatus 2 includes cameras 110 and a calculation device 500. The camera 110 includes a telecentric lens 111 and an image sensor 112. The calculation device 500 includes an image acquisition unit 310, a storage unit 380, and a calculation unit 590. The calculation unit 590 includes a side wheel detection unit 391.

Two cameras 110 are paired to configure an imaging unit pair 100. The number of imaging unit pairs 100 included in the abrasion inspection apparatus 1 may be one or more.

In FIG. 11, the same reference numerals (100, 110, 111, 112, 310, 380, and 391) are given to portions having the same functions as those of the units in FIG. 1 and a description thereof will be omitted.

The abrasion inspection apparatus 2 includes each unit detecting at least one of abrasion of the guide wheel 941 and abrasion of the branching wheel 951. On the other hand, the abrasion inspection apparatus 2 does not include each unit detecting abrasion of the traveling tire 921. Specifically, the abrasion inspection apparatus 2 does not include the laser sensor 200, the distance information acquisition unit 320, and the tire detection unit 392 among the units included in the abrasion inspection apparatus 1.

As in the case of the abrasion inspection apparatus 1, one of the cameras 110 configuring the imaging unit pair 100 in the abrasion inspection apparatus 2 is installed on a side of a track along which the vehicle 900 travels and is installed to image an inside of the track via the telecentric lens 111. The other of the cameras 110 configuring the imaging unit pair 100 is installed in the vehicle traveling direction with respect to the one camera 110 on the side of the track along which the vehicle 900 travels and is installed to image the inside of the track via the telecentric lens 111.

The image acquisition unit 310 acquires the image which is the image of the boundary of the guide wheel 941 captured by the camera 110 and is the image of the boundary on the first direction side in the vehicle traveling direction, and the image which is the image of the boundary of the guide wheel 941 and is the image of the boundary on the opposite side to the first direction side.

Then, the side wheel detection unit 391 detects the abrasion situation of the guide wheel 941 according to the positions of the boundaries shown in the images captured by the image acquisition unit 310.

Thus, the abrasion inspection apparatus 2 can automatically monitor the abrasion situation of the guide wheel 941. From this viewpoint, the abrasion inspection apparatus 2 can efficiently detect the abrasion situation of the guide wheel 941 which is one of the components of the vehicle.

The camera 110 includes the telecentric lens 111, and thus the side wheel detection unit 391 can calculate the distance between the boundaries of the guide wheel 941 without performing correction according to the position of a subject in the depth direction in the images captured by the cameras 110. From this viewpoint, it is possible to prevent a process load of the side wheel detection unit 391 from increasing.

Two cameras 110 image the boundaries of the guide wheel 941, and thus can capture the boundaries of both sides of the guide wheel 941 without using a telecentric lens with a large diameter. From the viewpoint that it is not necessary to use a telecentric lens with a large diameter, it is possible to suppress installation cost and prevent an increase in the size of the camera 110.

FIG. 12 is a schematic block diagram showing a functional configuration of an abrasion inspection apparatus 3 which is a second modification example of the abrasion inspection apparatus 1 according to the embodiment. In FIG. 12, the abrasion inspection apparatus 3 includes a laser sensor 200 and a calculation device 600. The calculation device 600 includes a distance information acquisition unit 320, a storage unit 380, and a calculation unit 690. The calculation unit 690 includes a tire detection unit 392.

In FIG. 12, the same reference numerals (200, 320, 380, and 392) are given to portions having the same functions as those of the units in FIG. 1 and the description thereof will be omitted.

The abrasion inspection apparatus 3 includes each unit detecting abrasion of the traveling tire 921. On the other hand, the abrasion inspection apparatus 3 does not include each unit detecting abrasion of the guide wheel 941 and abrasion of the branching wheel 951. Specifically, the abrasion inspection apparatus 3 does not include the cameras 110, the image acquisition unit 310, and the side wheel detection unit 391 among the units included in the abrasion inspection apparatus 1.

As in the case of the abrasion inspection apparatus 1, the laser sensor 200 in the abrasion inspection apparatus 3 is installed on the lower side of the track of the vehicle 900 and measures a distance to an object located on the upper side which has an inclination in the vehicle traveling direction with respect to the vertical direction. The tire detection unit 392 detects the abrasion situation of the traveling tire 921 according to the distance between the laser sensor 200 and the traveling tire 921 measured by the laser sensor 200.

Thus, the abrasion inspection apparatus 3 can automatically monitor an abrasion situation of the traveling tire 921. From this viewpoint, the abrasion inspection apparatus 3 can efficiently inspect the abrasion situation of the traveling tire 921 which is one of the components of the vehicle.

The laser sensor 200 measures a distance to the traveling tire 921 on the upper side which has an inclination in the vehicle traveling direction with respect to the vertical direction. The laser sensor 200 can measure the distance in a state in which the traveling tire 921 is not in contact with the ground, and accordingly, in a state in which the traveling tire 921 is weightless. Thus, the tire detection unit 392 can calculate the depth of the groove on the traveling tire 921 more accurately than when the traveling tire 921 is weighted.

A program realizing some or all of the functions of the calculation devices 300, 500, and 600 may be recorded on a computer-readable recording medium. Then, the process of each unit may be performed by causing a computer system to read the program recorded on the recording medium. The "computer system" mentioned herein includes an OS or hardware such as peripheral devices.

The "computer system" also includes a homepage supply environment (or display environment) when WWW systems are used.

The "computer-readable recording medium" is a portable medium such as a flexible disk, a magneto-optical disc, a ROM, or a CD-ROM and a storage device such as a hard disk contained in a computer system. The "computer-readable recording medium" includes a recording medium that dynamically retains a program for a short time as in a communication line when a program is transmitted via a network such as the Internet or a communication line such as a telephone line and a recording medium that retains a program for a given time, such as a volatile memory inside a computer system serving as a server or a client in this case. The program may be a program that realizes some of the above-described functions or may be a program that realizes the above-described functions in combination with a program already recorded in a computer system.

The embodiments of the present invention have been described above in detail with reference to the drawings, but specific configurations are not limited to the embodiments and include design changes within the scope of the present invention without departing from the gist of the present invention.

INDUSTRIAL APPLICABILITY

The present invention relates to an abrasion inspection apparatus including: a first imaging unit that is installed on a side of a track along which a vehicle in which a guide wheel is installed on a side travels and images an inside of the track via a telecentric lens; a second imaging unit that is installed in a vehicle traveling direction with respect to the first imaging unit on the side of the track and images the inside of the track via a telecentric lens; an image acquisition unit that acquires an image which is an image of a boundary of the guide wheel captured by the first imaging unit and is an image of a boundary on a first direction side in the vehicle traveling direction and an image which is an image of the boundary of the guide wheel captured by the second imaging unit at the same time as the capturing of the image by the first imaging unit and is an image of a boundary on an opposite side to the first direction side; and a guide wheel detection unit that detects the abrasion situation of the guide wheel according to a position of a boundary indicated in the images acquired by the image acquisition unit.

According to the invention, it is possible to efficiently detect the abrasion situation of a component of a vehicle.

REFERENCE SIGNS LIST

1 Abrasion inspection apparatus
100 Imaging unit pair
110 Camera
111 Telecentric lens
112 Image sensor
200 Laser sensor
300 Calculation device
310 Image acquisition unit
320 Distance information acquisition unit
380 Storage unit
390 Calculation unit
391 Side wheel detection unit
392 Tire detection unit
900 Vehicle
910 Vehicle body
921 Traveling tire 922, 942, 952 Shaft
930 Support
941 Guide wheel
951 Branching wheel

The invention claimed is:

1. An abrasion inspection apparatus comprising:
a first imaging unit that is installed on a side of a track, a vehicle traveling along the track, a guide wheel being installed on a side of the vehicle, the first imaging unit imaging an inside of the track via a telecentric lens;
a second imaging unit that is installed in a vehicle traveling direction with respect to the first imaging unit on the side of the track and images the inside of the track via a telecentric lens;
an image acquisition unit that acquires an image which is an image of a boundary of the guide wheel captured by the first imaging unit and is an image of a boundary on a first direction side in the vehicle traveling direction and an image which is an image of the boundary of the guide wheel captured by the second imaging unit at the same time as the capturing of the image by the first imaging unit and is an image of a boundary on an opposite side to the first direction side; and
a guide wheel detection unit that detects an abrasion situation of the guide wheel according to a position of a boundary indicated in the images acquired by the image acquisition unit, wherein
a rotation mechanism is in contact with the guide wheel and rotates the guide wheel.

2. The abrasion inspection apparatus according to claim 1, further comprising:
a third imaging unit that is installed on the side of the track along which the vehicle in which the guide wheel is installed on the side travels and images the inside of the track via a telecentric lens; and
a fourth imaging unit that is installed in the vehicle traveling direction with respect to the third imaging unit on the side of the track and images the inside of the track via a telecentric lens,
wherein the rotation mechanism is installed on the side of the track,
wherein both the first and second imaging units are installed at positions at which the images of the boundary of the guide wheel are captured before the rotation mechanism rotates the guide wheel,
wherein both the third and fourth imaging units are installed at positions at which the images of the boundary of the guide wheel are captured after the rotation mechanism rotates the guide wheel,
wherein the image acquisition unit further acquires an image which is an image of the boundary of the guide wheel captured by the third imaging unit and is an image of a boundary on the first direction side in the vehicle traveling direction and an image which is an image of the boundary of the guide wheel captured by the fourth imaging unit at the same time as the capturing of the image by the third imaging unit and is an image of the boundary on the opposite side to the first direction side, and
wherein the guide wheel detection unit detects an abrasion situation of the guide wheel according to a position of the boundary indicated in each of the image captured by the first imaging unit and the image captured by the second imaging unit and further detects an abrasion situation of the guide wheel according to the image captured by the third imaging unit and a position of the boundary indicated in each image captured by the fourth imaging unit.

3. The abrasion inspection apparatus according to claim 1, further comprising:
a distance measurement unit that is installed on a lower side of the track and measures a distance to an object located on an upper side which has an inclination in the vehicle traveling direction with respect to a vertical direction; and
a tire detection unit that detects an abrasion situation of a traveling tire according to a distance which is measured by the distance measurement unit and is a distance between the distance measurement unit and the traveling tire installed on a lower side of the vehicle.

4. An abrasion inspection method of an abrasion inspection apparatus including a first imaging unit and a second imaging unit, the first imaging unit being installed on a side of a track, a vehicle traveling along the track, a guide wheel being installed on a side of the vehicle, the first imaging unit imaging an inside of the track via a telecentric lens, the second imaging unit being installed in the vehicle traveling direction with respect to the first imaging unit on the side of the track, the second imaging unit imaging the inside of the track via a telecentric lens, the abrasion inspection method comprising:
acquiring an image which is an image of a boundary of the guide wheel captured by the first imaging unit and is an image of a boundary on a first direction side in the vehicle traveling direction and an image which is an image of the boundary of the guide wheel captured by the second imaging unit at the same time as the capturing of the image by the first imaging unit and is an image of a boundary on an opposite side to the first direction side; and
detecting an abrasion situation of the guide wheel according to a position of a boundary indicated in the acquired images, wherein
a rotation mechanism is in contact with the guide wheel and rotates the guide wheel.

5. A program for a computer used for an abrasion inspection apparatus including a first imaging unit and second imaging unit, the first imaging unit being installed on a side of a track, a vehicle traveling along the track, a guide wheel being installed on a side of the vehicle, the first imaging unit imaging an inside of the track via a telecentric lens, the second imaging unit being installed in the vehicle traveling direction with respect to the first imaging unit on the side of the track, the second imaging unit imaging the inside of the track via a telecentric lens, the program causing the computer to perform:
acquiring an image which is an image of a boundary of the guide wheel captured by the first imaging unit and is an image of a boundary on a first direction side in the vehicle traveling direction and an image which is an image of the boundary of the guide wheel captured by the second imaging unit at the same time as the capturing of the image by the first imaging unit and is an image of a boundary on an opposite side to the first direction side; and
detecting an abrasion situation of the guide wheel according to a position of a boundary indicated in the acquired images, wherein
a rotation mechanism is in contact with the guide wheel and rotates the guide wheel.

* * * * *